US012734731B2

(12) United States Patent
Seki

(10) Patent No.: US 12,734,731 B2
(45) Date of Patent: Sep. 15, 2026

(54) MOLDING DIE, METHOD FOR MANUFACTURING MOLDING DIE, AND METHOD FOR MANUFACTURING MOLDED PRODUCT

(71) Applicant: KASAI KOGYO CO., LTD., Kanagawa (JP)

(72) Inventor: Nobuaki Seki, Atsugi (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 49 days.

(21) Appl. No.: 18/998,445

(22) PCT Filed: Aug. 15, 2022

(86) PCT No.: PCT/JP2022/030846
§ 371 (c)(1),
(2) Date: Jan. 24, 2025

(87) PCT Pub. No.: WO2024/038479
PCT Pub. Date: Feb. 22, 2024

(65) Prior Publication Data
US 2026/0042244 A1 Feb. 12, 2026

(51) Int. Cl.
*B29C 33/56* (2006.01)
*B22D 17/14* (2006.01)
(Continued)

(52) U.S. Cl.
CPC .......... *B29C 33/424* (2013.01); *B22D 17/145* (2013.01); *B29C 33/18* (2013.01);
(Continued)

(58) Field of Classification Search
CPC ..... B29C 33/18; B29C 33/424; B29C 33/426; B29C 33/56; B29C 2045/14155;
(Continued)

(56) References Cited

U.S. PATENT DOCUMENTS 5,866,025 A 2/1999 Kataoka et al.
2012/0164387 A1* 6/2012 Watanabe .............. B29C 33/62
425/436 R
(Continued)

FOREIGN PATENT DOCUMENTS

CN 208341532 U * 1/2019
CN 110482481 A 11/2019
(Continued)

OTHER PUBLICATIONS

Office Action in corresponding Japanese Patent Application No. 2024-541293 dated Feb. 3, 2026, Japan, 2 pages.
(Continued)

*Primary Examiner* — Atul P. Khare
(74) *Attorney, Agent, or Firm* — United IP Counselors, LLC

(57) ABSTRACT

A molding die includes: a first mold formed of a steel material, the first mold including a first front surface serving as a contact surface that comes into contact with a molded product, a fine hole penetrating from the first front surface, and a plated layer formed on the first front surface and an inner wall of the fine hole; and a second mold configured to be combined with the first mold, the second mold including a second front surface that faces the first front surface to define a space between the first front surface and the second front surface.

12 Claims, 4 Drawing Sheets

(51) Int. Cl.

| | |
|---|---|
| ***B29C 33/18*** | (2006.01) |
| ***B29C 33/38*** | (2006.01) |
| ***B29C 33/42*** | (2006.01) |
| *B22C 9/06* | (2006.01) |
| *B29C 45/14* | (2006.01) |

(52) U.S. Cl.

CPC .......... *B29C 33/3842* (2013.01); *B29C 33/56* (2013.01); *B22C 9/067* (2013.01); *B29C 2045/14155* (2013.01)

(58) Field of Classification Search

CPC ....... B29C 51/10; B29C 51/36; B22D 17/145; B22C 9/067

See application file for complete search history.

(56) References Cited

U.S. PATENT DOCUMENTS

| | | | |
|---|---|---|---|
| 2021/0146582 | A1 | 5/2021 | Onishi et al. |
| 2021/0261405 | A1 | 8/2021 | Dai et al. |

FOREIGN PATENT DOCUMENTS

| | | | | | |
|---|---|---|---|---|---|
| CN | 111836706 | A | | 10/2020 | |
| CN | 112192829 | A | * | 1/2021 | ........... B29C 51/087 |
| EP | 3928945 | A1 | | 12/2021 | |
| JP | 57100039 | A | * | 6/1982 | |
| JP | H081708 | A | * | 1/1996 | ............. B29C 45/37 |
| JP | H10-193449 | A | | 7/1998 | |
| JP | 2005-081600 | A | | 3/2005 | |
| JP | 2013-215898 | A | | 10/2013 | |
| JP | 2017088969 | A | * | 5/2017 | |
| KR | 10-1998-0700158 | A | | 3/1998 | |
| KR | 102496609 | B1 | * | 2/2023 | ............. B29C 33/04 |
| WO | 96/16781 | A1 | | 6/1996 | |
| WO | 2020/170506 | A1 | | 8/2020 | |
| WO | 2021/004225 | A1 | | 1/2021 | |

OTHER PUBLICATIONS

International Search Report for International Application No. PCT/JP2022/030846 dated Oct. 18, 2022, Japan, 2 pages.

* cited by examiner

MOLDING DIE, METHOD FOR MANUFACTURING MOLDING DIE, AND METHOD FOR MANUFACTURING MOLDED PRODUCT

CROSS-REFERENCE TO RELATED APPLICATIONS

This application is a National Stage Entry application of PCT International Application No. PCT/JP2022/030846, filed on Aug. 15, 2022, the entire contents of which are hereby incorporated by reference.

BACKGROUND

1. Technical Field

The present invention relates to a molding die, a method for manufacturing a molding die, and a method for manufacturing a molded product.

2. Description of the Background

Conventionally, molding dies for manufacturing various products have been known. Such molding dies include also known one that includes fine penetration holes (fine holes) formed in the die. The fine penetration holes function as airflow pathways to enable, for example, vacuum molding in which a specific component is molded in a state of being sucked. The molding die including the fine holes can be fabricated through an electroforming process. For example, a nickel electroforming process includes forming an electroconductive layer on a surface of a mandrel, providing a large number of fine non-electroconductive portions on a surface of the electroconductive layer, and electroforming on a surface of this mandrel. Thereby, a nickel electroformed shell including a surface on which fine holes are formed can be acquired as a die. The nickel electroformed shell forms the surface of the molding die.

However, fabricating a nickel electroformed shell in the above-described nickel electroforming process takes a considerable length of time, for example, time equal to or longer than one and a half months. In view of it, a technique has been proposed for manufacturing a molding die having fine holes by cutting out a steel material (Japanese Patent Application Laid-Open Publication No. 2005-81600 hereinafter referred refer to as Patent Literature 1, for example).

BRIEF SUMMARY

However, since the molding die described in Patent Literature 1 is fabricated by cutting out a steel material, rust sometimes occurred in the molding die, depending on a type of resin used in manufacturing a product and a humidity environment in which the die was placed. Such rust sometimes peeled off and entered into the fine holes, and thus caused the clogging. In view of it, it is considered to apply a rust inhibitor to the die in order to prevent the rust from being generated. However, this rust inhibitor itself can enter into and remain in the fine holes, and can cause the clogging. Further, instead of cutting out a steel material, casting can fabricate a die made of a steel material and including the fine holes. However, even in this case, the problem of rust occurs, and thus, the problem of the clogging also occurs.

The present invention has been made in order to solve such a conventional problem. An object of the present invention is to provide a molding die, a method for manufacturing a molding die, and a method for manufacturing a molded product that enable reduction in a possibility of clogging of fine holes.

In order to solve the problem, a molding die according to the present invention is a molding die formed of a steel material and including a front surface portion as a surface that comes into contact with a molded product, fine holes being formed in the molding die, the fine holes penetrating from the front surface portion and functioning as airflow pathways, the molding die including a plated layer formed on the front surface portion and inner walls of the fine holes, the plated layer being made of an antirust metal that prevents generation of rust.

A method for manufacturing a molding die according to the present invention includes: a first step of fabricating a base body from a steel material, the base body including a front surface portion as a surface that comes into contact with a molded product; a second step of forming fine holes that penetrate from the front surface portion of the base body fabricated at the first step and that function as airflow pathways; and a third step of plating, with an antirust metal, the front surface portion formed at the first step and inner walls of the fine holes formed at the second step, the antirust metal preventing generation of rust.

A method for manufacturing a molded product according to the present invention includes manufacturing the molded product, using the molding die described above.

The present invention can provide a molding die, a method for manufacturing a molding die, and a method for manufacturing a molded product that enable reduction in a possibility of clogging of fine holes.

BRIEF DESCRIPTION OF DRAWINGS

FIG. 3A illustrates a steel-material processing step, FIG. 3B illustrates a texturing step, and FIG. 3C illustrates a fine-hole forming step.

DETAILED DESCRIPTION

The following describes the present invention with reference to a preferred embodiment. The present invention is not limited to the below-described embodiment, and can be appropriately modified within a range that does not depart from the essence of the present invention. Although the illustration and description of some configurations are omitted in the below-described embodiment, it is a matter of course that publicly known or well-known techniques are appropriately applied to details of the omitted techniques within a range in which no contradiction occurs with the contents described below.

Figure 1:
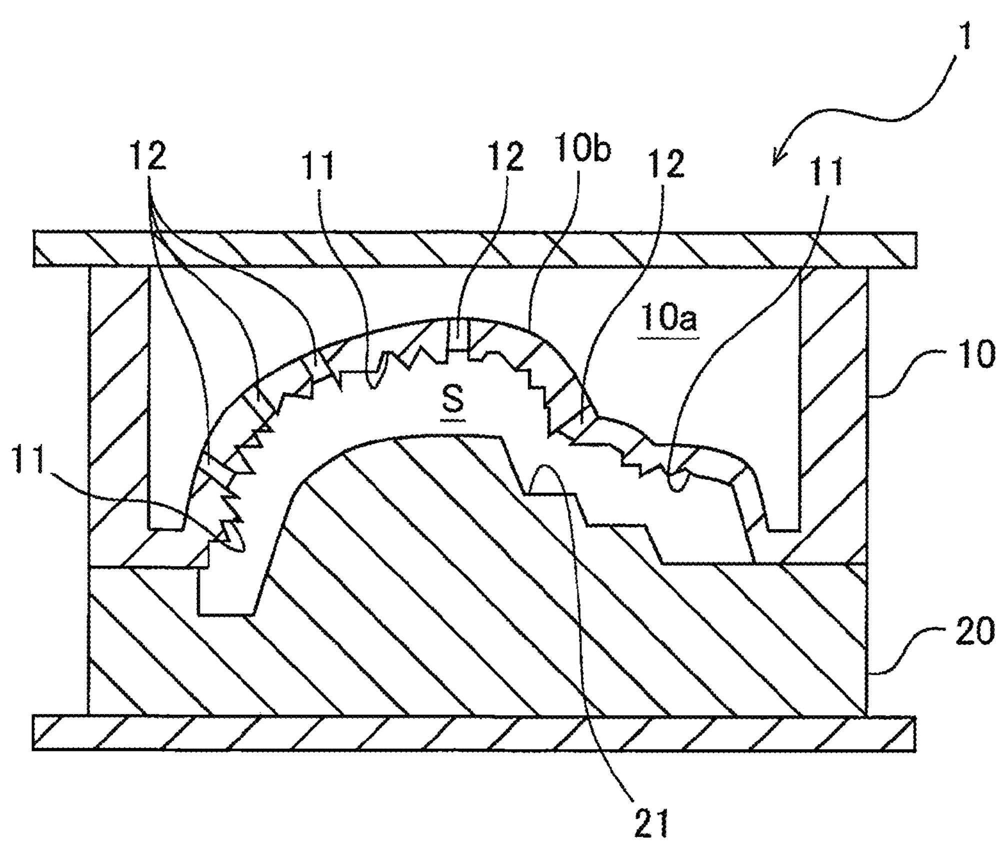
FIG. 1 is a sectional view illustrating a configuration of a molding die according to the present embodiment.

FIG. 1 is a sectional view illustrating a configuration of a molding die according to the present embodiment. As illustrated in FIG. 1, the molding die 1 according to the present embodiment is fabricated from a steel material, and includes an upper mold 10 and a lower mold 20. An unillustrated injection device for example is connected to such a molding die 1, and heated and molten resin is injected and charged into a space S sandwiched between the upper mold 10 and the lower mold 20. Thereby, a molded product is manufactured to have a shape depending on the space S. The molding die 1 is not limited to one used for injection molding, but may be one used for clamping a sheet material, or one used in a case of setting an already-formed core material, subsequently clamping a sheet material, and then vacuuming. Thus, a molding method using the molding die 1 is not particularly limited. In the present embodiment, the upper mold 10 and the lower mold 20 may be replaced with each other in terms of a mutual positional relation.

The upper mold 10 in such a molding die 1 includes a front surface portion 11 that has been textured. The front surface portion 11 is a portion as a surface that comes into contact with a molded product and that defines an external shape of the molded product. Texturing the front surface portion 11 causes a fine pattern or design, or the like to be formed on the molded product.

Further, the upper mold 10 is formed to have a predetermined plate thickness. A cavity 10*a* is formed on a back side of the front surface portion 11. The cavity 10*a* in FIG. 1 is a complete cavity. However, the cavity 10*a* is not limited to this, and may be charged with an aluminum grid or the like. The upper mold 10 may have the thickness that can maintain a shape of the upper mold 10 during molding. Particularly, the upper mold 10 has the thickness secured to prevent distortion or the like of the upper mold 10 even when a large number of the below-described fine holes 12 are formed in the upper mold 10.

In addition, a plurality of the fine holes 12 are formed in the upper mold 10. The fine holes 12 penetrate from the front surface portion 11 to function as airflow pathways. A diameter of each of the fine holes 12 is set within a range that does not affect a surface of a molded product. A plurality of the fine holes 12 are used for attracting a skin material by sucking or for transferring a texture to a skin material at the time of molding a vehicle interior component, for example. A use purpose of a plurality of the fine holes 12 is not particularly limited to this, and a plurality of the fine holes 12 may be used for other purposes such as supplying of compressed air, as long as a plurality of the fine holes 12 function as airflow pathways.

The lower mold 20 is paired with the upper mold 10. In the present embodiment, a cavity is not formed on a back side of a front surface portion 21 of the lower mold 20, and the lower mold 20 does not include fine holes. The lower mold 20 is not particularly limited to this, and may form one or both of a cavity and holes.

Further, in the present embodiment, the upper mold 10 and the lower mold 20 each include a plated layer made of an antirust metal. Here, the antirust metal refers to at least one of steel, nickel, chromium, zinc, gold, silver, rhodium, platinum, and palladium, or an alloy including any of these metals, and is defined as a metal that exhibits an antirust effect. The lower mold 20 does not need to be plated with an antirust metal, and thus does not necessarily need to include the plated layer.

Figure 2:
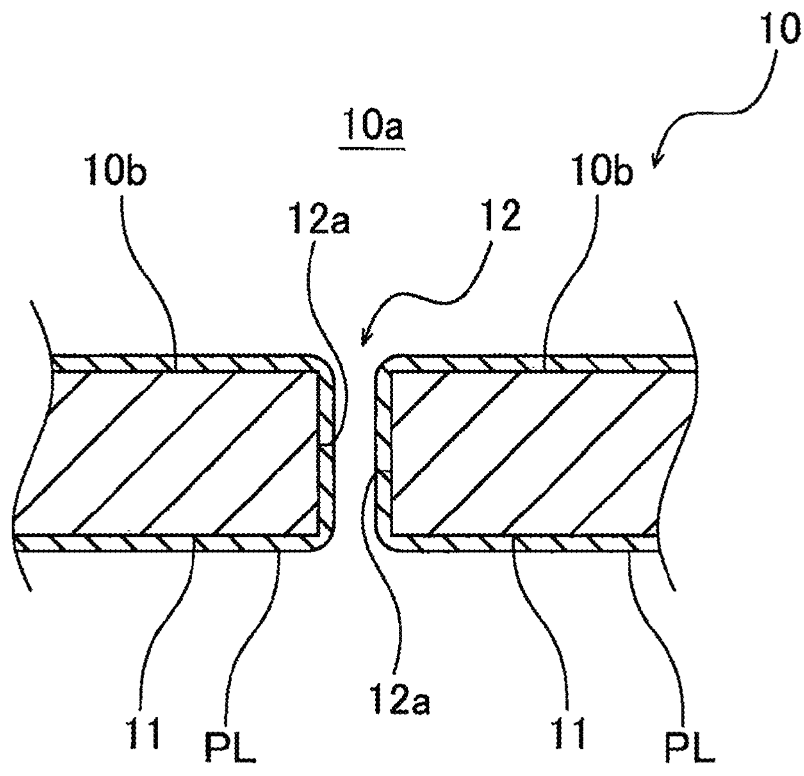
FIG. 2 is an enlarged view illustrating the vicinity of fine hole illustrated in FIG. 1.

As described above, in the present embodiment, at least the front surface portion 11 of the upper mold 10 is plated and coated with the antirust metal. FIG. 2 is an enlarged view illustrating the vicinity of the fine hole 12 illustrated in FIG. 1. As illustrated in FIG. 2, the upper mold 10 includes the plated layer PL that is made of the antirust metal and that is formed not only on the front surface portion 11 but also on inner walls 12*a* of the fine holes 12.

The above-described plating coating prevents rust from being generated directly on the inner walls 12*a* of the fine holes 12 and thus causing the clogging, and prevents rust from being generated on the front surface portions 11 and 21, peeling off, then entering into the fine holes 12, and thus causing the clogging.

Here, the upper mold 10 forms the cavity 10*a*, and thus, the plated layer PL made of the antirust metal is preferably formed also on a back surface portion 10*b* that defines the cavity 10*a* and that is on a back side of the front surface portion 11. This is because rust can be thereby prevented from being generated on the back side, peeling off, then entering into the fine holes 12, and thus causing the clogging.

Figure 3A:
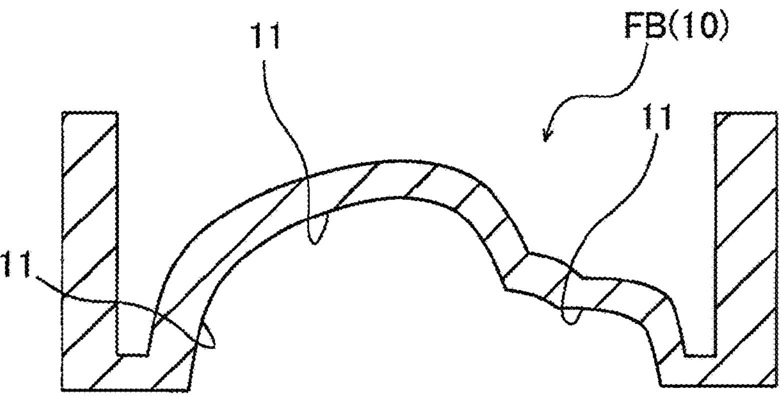
FIG. 3A to FIG. 3C are step diagrams illustrating a method for manufacturing the molding die according to the present embodiment.
Figure 3B:
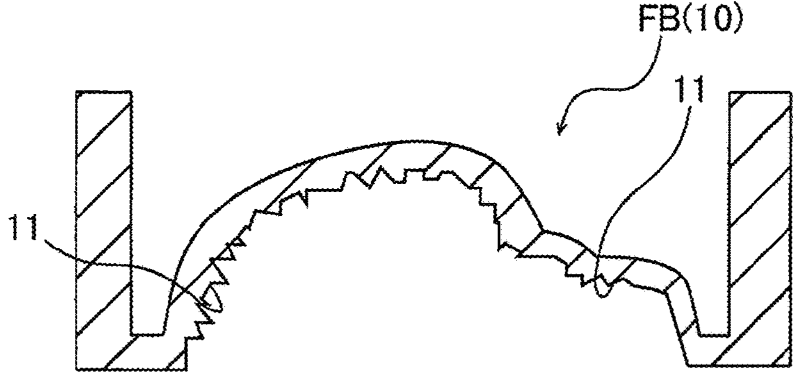
Figure 3C:
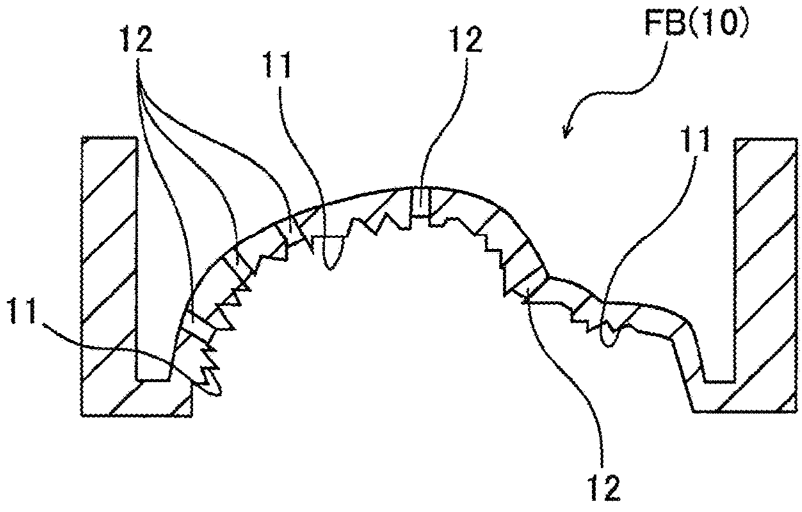

Next, a method for manufacturing the molding die 1 according to the present embodiment is described. FIG. 3A to FIG. 3C are step diagrams illustrating the method for manufacturing the molding die 1 according to the present embodiment. FIG. 3A illustrates a steel-material processing step, FIG. 3B illustrates a texturing step, and FIG. 3C illustrates a fine-hole forming step. FIG. 3A to FIG. 3C illustrate the method for manufacturing the upper mold 10 in the molding die 1.

First, a base body FB including the front surface portion 11 depending on a shape of a molded product is manufactured as illustrated in FIG. 3A (the steel-material processing step: a first step). At the steel-material processing step, the base body FB is manufactured by cutting out a steel block, or casting, for example.

Next, the front surface portion 11 of the base body FB is textured as illustrated in FIG. 3B (the texturing step). At the texturing step, the front surface portion 11 is textured by etching, a laser, numerical control (NC) machining, or the like.

In the case of the NC machining, the steel-material processing step and the texturing step may be integrated into the same step. This is because the number of the manufacturing steps can be thereby reduced by one.

After the texturing step, the fine holes 12 are formed to penetrate from the front surface portion 11 as illustrated in FIG. 3C (the fine-hole forming step: a second step). At the fine-hole forming step, the fine holes 12 are formed by electric discharge, drilling, a laser, NC machining, or the like. As long as the fine holes 12 are open on the front surface portion 11 in such a way as to penetrate, the fine holes 12 may be formed from the front surface portion 11 in such a way as to penetrate, or may be formed from the back surface portion 10*b* in such a way as to penetrate.

Although the fine-hole forming step follows the texturing step in the present embodiment, turns of these steps may be replaced with each other. However, it is more advantageous from a manufacturing standpoint that the texturing step precedes the fine-hole forming step, for the following reason. For example, when the texturing step follows the fine-hole forming step 12, the inner walls of the fine holes 12 are irradiated with a laser for the texturing, or etching liquid enters into the fine holes12. As a result, sizes of the fine holes 12 become larger, and thus, a trace of the fine holes 12 is left on a molded product.

Next, the base body FB in which the fine holes 12 are formed is plated with the antirust metal (a coating step: a third step). At the coating step, for example, the base body FB is immersed in a plating tank. Thereby, the plating layer PL (refer to FIG. 2) made of the antirust metal is formed on an entire surface (the entire surface including not only the front surface portion 11 but also the inner walls 12*a* of the fine holes 12 and an inner surface of the cavity 10*a*) of the base body FB. The plated layer PL made of the antirust metal is not limited to a layer formed on the entire surface of the base body FB, and may be formed only on the front surface portion 11 and the inner walls 12*a* of the fine holes 12 or may be formed further on the back surface portion 10*b* that is on a back side of the front surface portion 11. The plated layer PL may be formed by vapor deposition or the like, for example, without limitation to the immersing the base body FB in the plating tank.

As described above, according to the molding die 1 and the method for manufacturing the molding die 1 in the present embodiment, the plated layer PL made of the antirust metal is formed on the front surface portion 11 and the inner walls 12*a* of the fine holes 12 that penetrate from the front surface portion 11 and that function as airflow pathways. Thereby, rust can be suppressed from being generated on the front surface portion 11 of the steel material and the inner walls 12*a* of the fine holes 12, and the clogging is suppressed from occurring due to the rust. In addition, a rust inhibitor does not need to be applied, and the clogging caused by the rust inhibitor can be avoided. Thus, the molding die 1 and the method for manufacturing the molding die 1 can be provided to enable reduction in a possibility of the clogging of the fine holes 12.

In the case of fabricating the base body FB forming the cavity 10*a* on a back side of the front surface portion 11, an amount of a used steel material can be reduced by a volume of the back-side cavity 10*a* for which the steel material is not needed in the molding. Further, plating also the back surface portion 10*b* with the antirust metal can reduce a possibility that the clogging occurs due to rust generated on the back surface portion 10*b* of the cavity 10*a*.

Further, according to the present embodiment, the steel material is processed, and thus, electroforming is not needed, and a mold fabrication period can be shortened. The shortening of the mold fabrication period and the like can reduce the mold cost accordingly. Furthermore, in the case of the manufacturing by cutting out the steel block, the machining enables dimensional accuracy to be improved. Using the steel material enables the shape to be more easily maintained than in the case of using a nickel electroformed shell. In addition, a complicated mold structure such as a slide mold can be implemented as compared to a case of using electroforming.

In addition, when the electroforming is used as in the conventional case, a mold structure is made in such a way that the nickel electroformed shell is supported by an aluminum grid or the like. However, when the steel material is used, the thermal conductivity can be lower than that in the conventional structure, and thus, the mold that more easily cools down can be fabricated. For this reason, when the mold is heated for use, the mold can be easily kept warm, and thus, generation of a shock line can be suppressed.

Further, according to a method for manufacturing a molded product in the present embodiment, the above-described molding die 1 is used. Accordingly, the molded product is manufactured by use of the molding die 1 that reduces a possibility of clogging of the fine holes 12. Thus, the steps such as attracting a skin material by sucking and transferring a texture to a skin material can be appropriately performed so that a molded product having improved quality can be provided.

Although the present invention is described above based on the embodiment, the present invention is not limited to the above-described embodiment, and may be modified within a range that does not depart from the essence of the present invention, and may be combined with a publicly known or well-known technique if possible.

For example, in the above-described embodiment, the fine holes 12 are formed only in the upper mold 10, and the inner walls 12*a* of the fine holes 12 are plated. However, this configuration is not particularly limited to the upper mold 10, and fine holes may be formed also in the lower mold 20, and inner walls of these fine holes may be plated. Further, when a third mold or more molds may be provided in addition to the upper mold 10 and the lower mold 20, front surface portions and inner walls of fine holes in the third mold or the more molds may be plated.

In the present embodiment, it is assumed that the molding die 1 is used for vacuum molding. However, there is no particular limitation to vacuum molding. In addition, although the molding die 1 according to the present embodiment is textured, the molding die in the present invention does not need to be textured.

Figure 4:
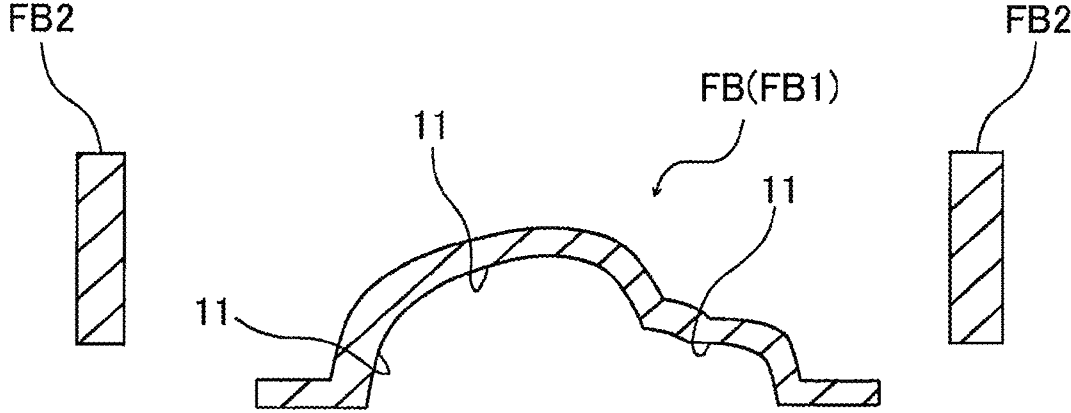
FIG. 4 is a step diagram illustrating a method for manufacturing a molding die according to the present embodiment, and illustrates a modified example of the steel-material processing step.

Furthermore, in the above-described example, for example, cutting out a steel block at the steel-material processing step fabricates the base body FB. However, there is no limitation to this. FIG. 4 is a step diagram illustrating a method for manufacturing a molding die according to the present embodiment, and illustrates a modified example of the steel-material processing step. The base body FB in the example illustrated in FIG. 4 is constituted by a contact portion FB1 and side surface portions FB2. The contact portion FB1 is a portion that comes into contact with a molded product at the time of manufacturing the molded product, and is a portion corresponding to the front surface portion 11 and the back surface portion 10*b* described above. The side surface portions FB2 are portions to be attached to the contact portion FB1. In the modified example illustrated in FIG. 4, the contact portion FB1 and the side surface portion FB2 are manufactured separately, and then, the these portions FB1 and FB2 are attached to each other. In this manner, at the steel-material processing step according to the modified example, the respective portions FB1 and FB2 may be manufactured separately and then attached to each other.

REFERENCE SIGNS LIST

1: molding die
10: upper mold
10*a:* cavity
10*b:* back surface portion
11: front surface portion
12: fine holes
12*a:* inner wall
20: lower mold
21: front surface portion
FB: base body
PL: plated layer

The invention claimed is:

1. A molding die, comprising:

a first mold formed of a steel material, the first mold including
- a first front surface serving as a contact surface that comes into contact with a molded product,
- a fine hole penetrating from the first front surface to a first back surface of the first mold located on a back side of the first front surface, and
- a plated layer formed on the first front surface and an inner wall of the fine hole; and a second mold configured to be combined with the first mold to define a space between the first front surface and a second front surface of the second mold facing the first front surface.

2. The molding die according to claim 1, wherein the first front surface is textured.

3. The molding die according to claim 2, wherein the first mold includes a cavity located on the back side of the first front surface, and the plated layer is formed on the first back surface.

4. The molding die according to claim 2, wherein the plated layer comprises an antirust metal.

5. The molding die according to claim 1, wherein the first mold includes a cavity located on the back side of the first front surface, and the plated layer is formed on the first back surface.

6. The molding die according to claim 5, wherein the plated layer comprises an antirust metal.

7. The molding die according to claim 1, wherein the plated layer comprises an antirust metal.

8. A method for manufacturing a molding die, comprising:

fabricating a base body from a steel material, the base body including a front surface serving as a contact surface that comes into contact with a molded product;

forming a fine hole that penetrates from the front surface to a first back surface of the base body located on a back side of the first front surface;

plating the front surface and an inner wall of the fine hole with an antirust metal that prevents generation of rust; and providing a second mold configured to be combined with the first mold to define a space between the first front surface and a second front surface of the second mold facing the first front surface.

9. The method for manufacturing the molding die according to claim 8, further comprising texturing the front surface.

10. The method for manufacturing the molding die according to claim 9, further comprising:

forming a cavity in the base body; and plating the back surface with the antirust metal.

11. The method for manufacturing the molding die according to claim 8, further comprising:

forming a cavity in the base body; and plating the back surface with the antirust metal.

12. A method for manufacturing a molded product, comprising:

manufacturing the molded product using the molding die according to claim 1 while passing air through the fine hole.

* * * * *